United States Patent [19]

Stravitz

[11] 4,369,883
[45] Jan. 25, 1983

[54] TAPE CASSETTE STORAGE AND CARRYING CASE

[76] Inventor: David M. Stravitz, 16 Park Ave., (Suite 14A), New York, N.Y. 10016

[21] Appl. No.: 258,007

[22] Filed: Apr. 27, 1981

[51] Int. Cl.³ .......................................... B65D 85/67
[52] U.S. Cl. .................................... 206/387; 220/4 E; 220/343
[58] Field of Search ................. 206/387, 549, 315 R; 190/57; 220/4 B, 4 E, 94 A, 343; 312/9, 10, DIG. 33

[56] References Cited

U.S. PATENT DOCUMENTS

| | | | |
|---|---|---|---|
| D. 165,219 | 11/1951 | Degner | 206/549 X |
| 626,141 | 5/1899 | Carter | 220/4 E |
| 2,740,632 | 4/1956 | Balmer | 220/343 X |
| 3,710,900 | 1/1973 | Fink | 312/10 X |
| 4,164,309 | 8/1979 | Staats | 206/387 X |
| 4,189,054 | 2/1980 | Liu et al. | 206/634 |

FOREIGN PATENT DOCUMENTS 63875 8/1945 Denmark ............................ 312/10

Primary Examiner—William Price
Assistant Examiner—Brenda J. Ehrhardt
Attorney, Agent, or Firm—Frishauf, Holtz, Goodman & Woodward

[57] ABSTRACT

A tape cassette storage and the carrying case comprising hollow shell members pivotally connected together and being relatively movable between a closed position and an open position. The shells have a support arrangement mounted at the inner bottom ends thereof which defines a plurality of stepped support levels for cassettes which are inserted into the shells from the open ends of the shells. The support levels for each cassette are different and are stepwise graduated in an ascending manner from the front toward the back of the shell members, the step support level of the two shell members ascending in opposite directions. A lock is provided to lock the shells in the closed position, and a friction lock is provided to lock the shells in their open position.

10 Claims, 13 Drawing Figures

U.S. Patent   Jan. 25, 1983   Sheet 1 of 3   4,369,883
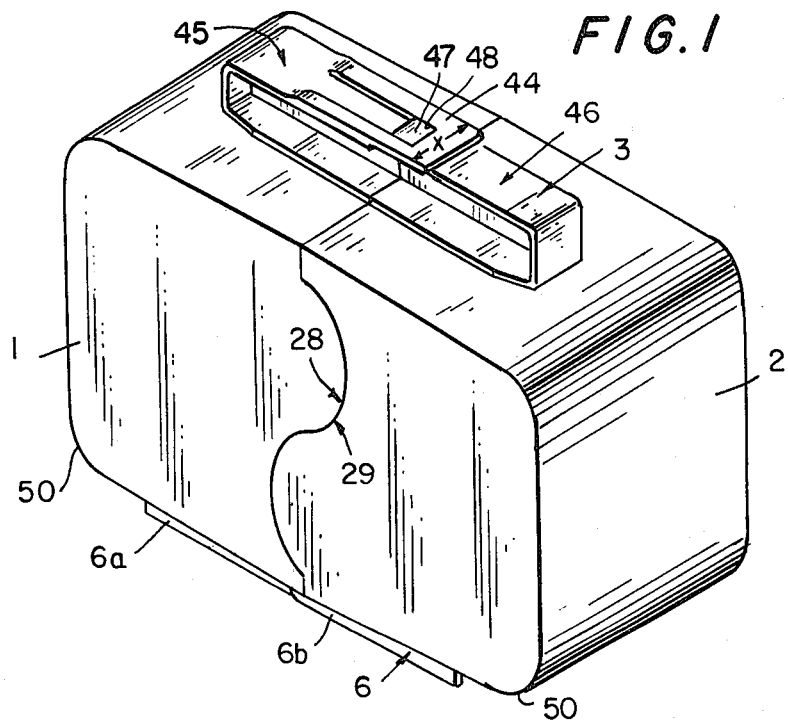
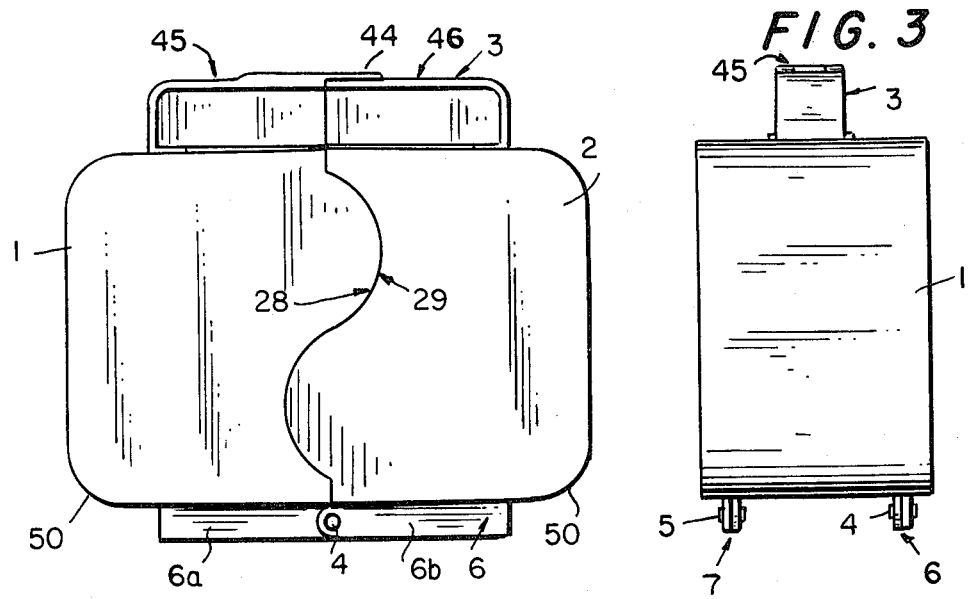

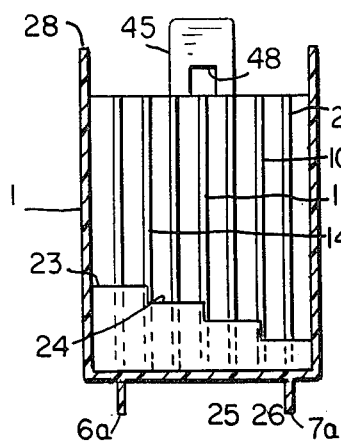
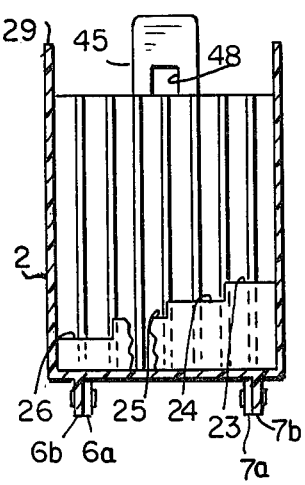
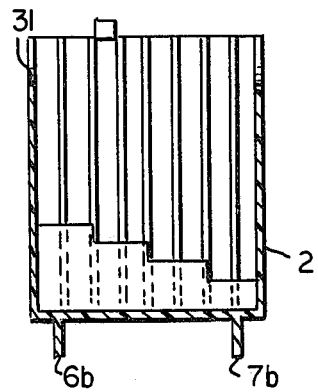
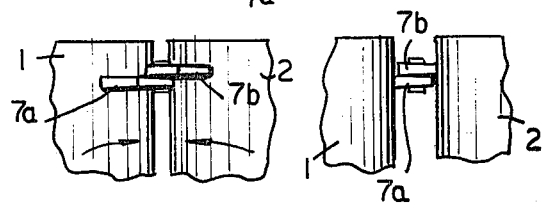
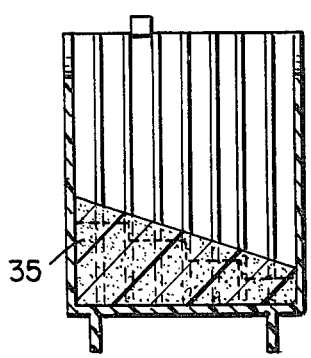
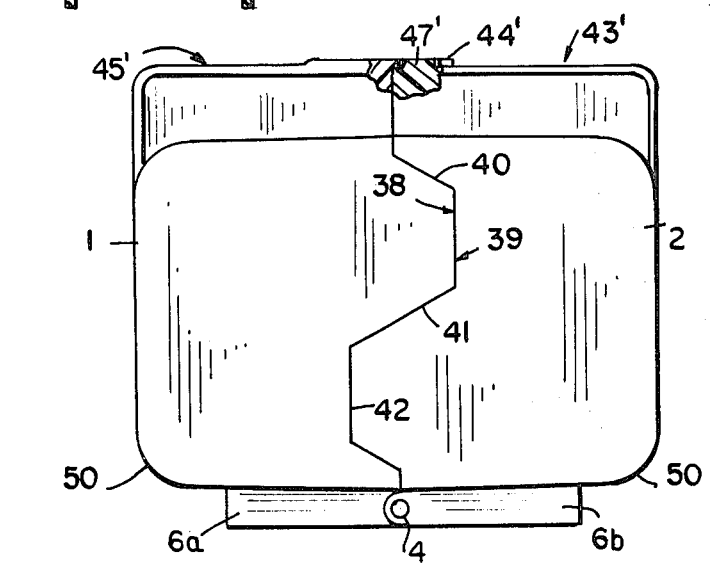

TAPE CASSETTE STORAGE AND CARRYING CASE

BACKGROUND OF THE INVENTION

This invention relates to a tape cassette storage and carrying case, and more particularly to such a tape cassette case wherein the cassettes are securely held for storage, and wherein the cassettes are easily removed for use.

The object of the invention is to provide such a tape cassette storage and carrying case which is easy to manufacture, easy to handle, easy to open and in which the cassettes are easily removed therefrom.

SUMMARY OF THE INVENTION

According to the present invention, a tape cassette storage and carrying case comprises first and second substantially hollow shell members each having an open end and a bottom opposite the open end, the shell members being pivotally connected together and being relatively movable between a closed position wherein the open ends face each other, and an open position wherein sides of the shells are adjacent each other; support means mounted at the inner, bottom ends of the shell members and defining a plurality of stepped support levels for cassettes inserted in the shells from the open ends of the shells, the support levels for each adjacent cassette being different and being stepwise graduated relative to the adjacent support levels, the stepped support levels of the shell members being graduated in opposite directions; and means for maintaining the shells in the closed position to enclose cassettes stored therein.

Preferably the support levels of each shell are stepwise graduated in ascending or descending manner from the front toward the back of the shell members. Further, the shell members preferably each have a cut-out wall portion and a protruding wall portion at the open ends thereof, the protruding wall portion of one shell being in mating registration with the cut-out wall portion of the other shell.

In a further preferred arrangement, a friction lock is provided for maintaining the shell members in an open position adjacent each other, and the shell members have highly rounded bottom corners at the corners adjacent the pivoting means to facilitate opening of the carrying case.

BRIEF DESCRIPTION OF THE DRAWINGS

FIG. 1 is a front perspective view of a tape cassette storage and carrying case according to the present invention;

FIG. 2 is a front elevational view thereof, the rear elevational view being identical;

FIG. 3 is a left side elevational view thereof, the right side elevational view being identical;

FIGS. 7-9 are sectional views taken at various positions in FIG. 6;

FIG. 10 is a sectional view of a modified embodiment;

FIGS. 11 and 12 are enlarged fractional views of the hinge portion of the present invention; and FIG. 13 illustrates a modified embodiment, and also showing the construction of the closure catch in greater detail.

DETAILED DESCRIPTION

Referring to FIGS. 1-6, the cassette storage and carrying case, hereinafter referred to as "case", comprises two shell portions 1, 2, each shell 1, 2 having a portion of a handle 3 formed on the upper surface thereof. The handle 3 incorporates a locking catch to maintain the case in the closed position, as will be discussed in greater detail hereinbelow.

Figure 4:
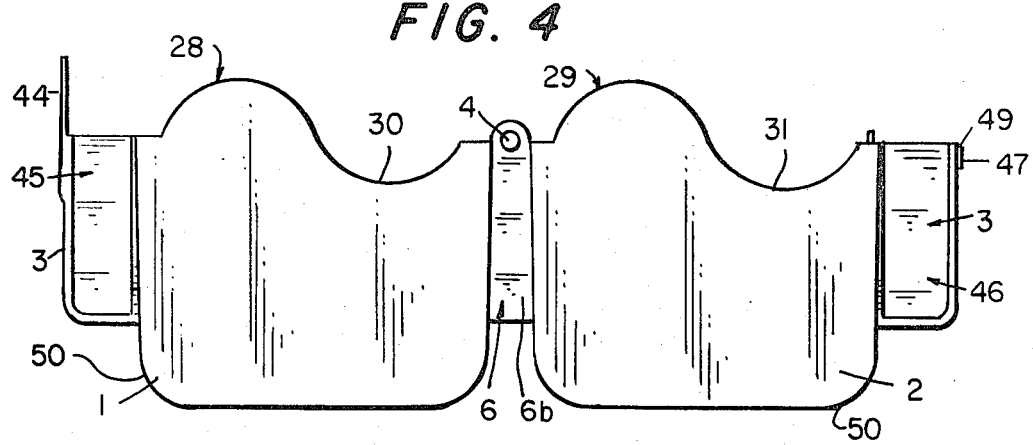
FIG. 4 is a front elevational view in the open state.
Figure 5:
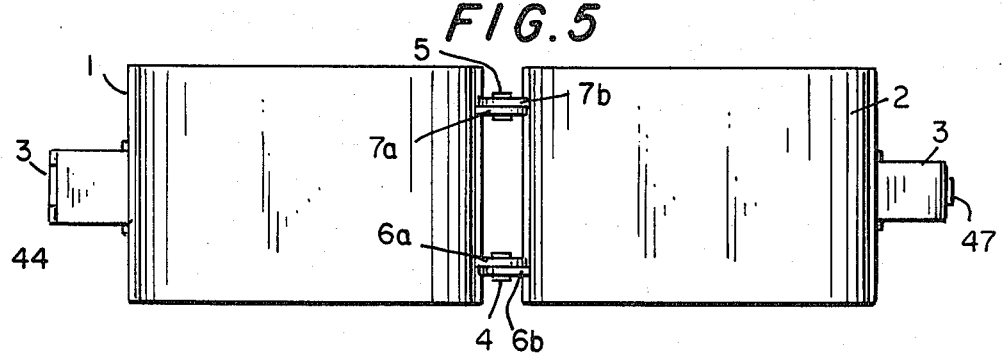
FIG. 5 is a bottom view in the open state.
Figure 6:
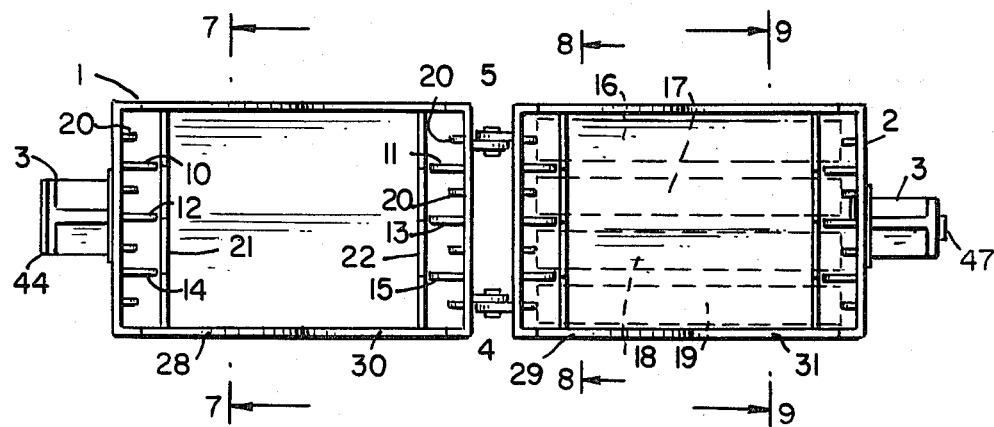
FIG. 6 is a top view in the open state.

The shell portions 1, 2 are pivotally connected by means of pivot pins 4, 5 which may, for example, take the form of rivets or other rigid members. The case has legs or feet 6, 7 which serve to raise the case and which also serve as locking members to maintain the two shells 1, 2 in their open position. More particularly, the leg 6 comprises pivotally connected portions 6a, 6b and the leg 7 comprises pivotally connected portions 7a, 7b. When the shells 1, 2 are pivotally moved to their opened condition as shown in FIGS. 4-6, the leg members 6a and 6b have an interference fit relative to each other to provide a frictional sliding lock to maintain the shells in their open state. A similar frictional sliding locking arrangement can be provided with respect to leg portions 7a, 7b. The interference fit is better seen in FIGS. 11 and 12, FIG. 11 illustrating the shells 1, 2 in a partially open state, and FIG. 12 illustrating the shells 1 and 2 in the fully opened state. As shown in FIGS. 11 and 12, the leg portions 7a, 7b are angled relative to each other such that when pivoted to the fully opened condition, they frictionally engage each other along at least a portion of the length thereof to effectively lock the shells 1, 2 in the open position in a simple and expedient manner. This frictional, sliding locking arrangement is achieved without complex mechanisms which could complicate molding and increase costs.

FIG. 6 is a top view of the interior of the shells 1, 2. Only one of the shells 1, 2 will be described in detail hereinbelow since both shells are substantially identical in general construction. The left side of shell 1 is provided with horizontally extending partitions 10, 12 and 14, and the right side is provided with respective partitions 11, 13 and 15 which are in alignment with respective partitions 10, 12, 14. Thus, four tape cassette compartments are provided for receiving four cassette tape boxes 16-19 shown in dashed lines in the right shell 2 in FIG. 6. Spacer ribs 20 are provided to space the cassette cases from the side edges of the shells 1, 2.

As best seen in FIGS. 7-9, the shells 1, 2 are also provided with cassette support members 21, 22 which are stepped to provide different levels of support at the respective storage compartments of the tape cassette carrying case. The cassettes inserted into the carrying case respectively rest on the steps 23-26 (FIG. 7) so that the upper edges of the stored cassettes are in a corresponding stepped arrangement to provide for easier removal of the individual stored cassettes from the carrying case.

As seen from FIG. 8, the stepped arrangement in the right hand shell 2 is opposite from that of left hand shell 1. By virtue of this arrangement, the cassette carrying case can be closed and the highest level cassette (on step 23) in one shell will be in registration with the lowest level cassette (on step 26) in the mating shell. This maintains the oppositely mounted cassettes securely in position and reduces rattling when the case is closed.

It is pointed out that the abutting surfaces 28, 29 of shells 1, 2 are generally "S" shaped in the embodiment of FIGS. 1-12. When the shells 1, 2 are closed, the S-shaped adjacent portions are in registration to provide a substantially fully closed structure to prevent intrusion of dust and other contaminating particles. When opened, the recesses 30, 31 (see FIG. 4) provide a finger gripping open area for sliding the lowermost mounted tape cassette (resting on lowermost step of ribs 21, 22) out of the case. The lowermost tape cassette extends above the lowermost portion of the recesses 30, 31 so that it may be gripped by the fingers of a user and slid upwardly out of the storage case. This is an important feature of the invention.

FIG. 10 illustrates a modified arrangement having a resilient wedge of foamed plastic, foam rubber, or the like, 35 mounted in the lower portion of the shells 1, 2 between stepped support members 21, 22. The wedge 35 extends just above the stepped support members 21, 22. When the cassettes are mounted in the shells 1, 2 of the storage case and the case is closed, the cassettes in one shell with have their upper surfaces bearing against respective upper surfaces of the cassettes in the other shell to slightly push them downwardly against the resilient wedge 35 toward the respective steps. The slight biasing pressure exerted by the wedge 35 further prevents rattling of the cassettes in the case when the case is closed. A further advantage is that when the shells are opened, the resiliency of the wedge 35 will push or spring the cassettes slightly upwardly to facilitate removing them from the storage case.

FIG. 13 illustrates a modified arrangement wherein the generally S-shaped abutting surfaces 28,29 of the embodiment of FIGS. 1-12 are replaced by generally trapezoidal surfaces 38,39. The trapezoidal surfaces 38,39, which generally form a "S-shape" perform substantially the same functions as the surfaces 28,29 shown in the embodiment of FIGS. 1-12. The sloped portions 40,41 and 42 provide relief areas to permit the shells 1, 2 to be pivoted relative to each other from the closed to the open position. The internal construction of the embodiment of FIG. 13 is identical to that of FIGS. 1-12, as well as the construction of the legs and pivoting mechanism.

In the FIG. 13 embodiment, the handle 43 extends the full width of the case, the dimension of the handle in the side view being substantially identical to that shown in FIG. 3.

The locking catches on the handle 3 of the embodiment of FIGS. 1-12 is substantially identical to that in the embodiment of FIG. 13. The description below will be given with respect to the locking catch in the embodiment of FIGS. 1-12. The locking catch in FIG. 13 will not be described separately, but identical numerals, but primed, will be used to designate corresponding parts in FIG. 13, the detailed description thereof being omitted. The handle 3 comprises a left side portion 45 with a resilient projection 44 and a right side portion 46 which has a projection 47 which is releasably and lockingly engageable with the projection or resilient extension 44. The resilient extension or projection 44 is wider in the direction of dimension "x" than the remaining portions of the handle, and particularly the portion of the handle 46. This is to provide a gripping area for the users fingers in order to lift the resilient projection or extension 44 relative to the remaining portions of the handle to disengage the projection 47 from the slot 48 formed in the extension 44. The arrangement of the locking device shown in FIGS. 1-13 is of particular advantage since it permits the shells, with the integral handle and locking device, to be manufactured without using a cam-action mold. The material of the handle is preferably a resilient plastic material with "memory", such as ABS or impact styrene. The projection 47 preferably has a tapered leading edge 49 to facilitate engagement of the extension 44 over the projection 47 when closing the cassette carrying case.

An important feature of the present invention is the provision of the rounded bottom edges 50 of the shells 1, 2. By virtue of the rounded bottom edges, the carrying case of the present invention can be easily opened with only one hand. This is of particular advantage when the carrying case is used in an automobile and the driver opens the carrying case. This enables the driver to easily open the carrying case with one hand, while still maintaining control of the vehicle with the other hand. This is accomplished by lifting the projection or extension 44 to release the lock and then rolling either one of the shells over the rounded edges 50 to automatically cause the shells to pivot with respect to each other about pivot point 4, thereby easily opening the case. For example, assuming the user opens the case by gripping and rolling shell 2 in the clockwise direction after releasing the closing latch, the pivot point 4 will also rotate in a clockwise direction and be raised upwardly. This automatically causes the left-hand shell 1 to rotate in the counterclockwise direction. The rotation of one of the shells is continued until the legs 6a, 6b reach the positions shown in FIG. 4, at which position they frictionally engage and lock with each other to maintain the carrying case in the open position, thereby permitting the user to easily remove the desired cassette, without excessive fumbling. Since the carrying case remains frictionally locked in its open position, removing cassettes therefrom is facilitated, especially when the user is operating an automobile.

While the invention has been described above with respect to specific embodiments, it should be clear that various modifications and alterations can be made within the scope of the invention as defined in the appended claims. For example, the form and shape of the closure lock may be varied, as desired, as may the shape of the abutting surfaces 28, 29. The overall outer shape of the carrying case may also be varied, as desired. The complete case is preferably molded in two pieces, to wit: two shells each having integral handle portions, of ABS or impact styrene.

I claim:

1. A tape cassette storage and carrying case, comprising:

first and second substantially hollow shell members (1,2) each having an open end and a bottom opposite said open end, said shell members being pivotally connected together and being relatively movable between a closed position wherein said open ends face each other, and an open position wherein sides of said shells are adjacent each other;

support means (21,22) mounted at the inner, bottom ends of said shell members and defining a plurality of stepped support levels for cassettes inserted in the shells from the open ends of said shells, the support levels for each cassette being different and being stepwise graduated in an ascending manner from the front toward the back of the shell members, the stepped support levels of the shell members (1, 2) ascending in opposite directions; and means for maintaining said shells in said closed position to enclose cassettes stored therein.

2. The cassette storage and carrying case of claim 1, wherein said shells each have a cut-out wall portion and a protruding wall portion at the open ends thereof, the protruding wall portion of one shell being in mating registration with the cut-out wall portion of the other shell.

3. The cassette storage and carrying case of claim 1, further comprising a friction lock arrangement for maintaining said shells in an open position adjacent each other.

4. The cassette storage and carrying case of claim 3, wherein said friction lock arrangement comprises respective legs on said shells, at least one of said legs being an elongated member and being angled relative to a leg of the other of said shells and engaging therewith, said engaging legs frictionally engaging to friction lock said shells in an open position adjacent each other.

5. The cassette storage and carrying case of claim 4, comprising at least one elongated leg on each of said shells, the legs of each shell being pivotally connected together to provide the pivotal connection between said first and second shells, at least one of said legs having an angulated portion relative to the other of said legs and providing said interference fit when in engagement.

6. The cassette storage and carrying case of claim 1, wherein said shells have highly rounded corners at the corners adjacent the pivoting means to facilitate opening of said carrying case.

7. The cassette storage and carrying case of claim 1, further comprising a resilient member in said shells and extending above said step support member and against which cassettes stored in said carrying case rest.

8. The cassette storage and carrying case of claim 7, wherein said resilient member comprises a generally wedge-shaped resilient member.

9. The cassette storage and carrying case of claim 2, wherein said cut-out wall portions of said shells are generally S-shaped, the S-shapes of each shell being opposite each other so as to mate with each other.

10. The cassette storage and carrying case of claim 2, wherein said cut-out wall portions of said shells are generally trapezoidal shaped, the trapezoidal shapes of each shell being oppositely directed relative to each other so as to mate with each other.

* * * * *

UNITED STATES PATENT AND TRADEMARK OFFICE
CERTIFICATE OF CORRECTION

PATENT NO. : 4,369,883

DATED : January 25, 1983

INVENTOR(S) : David M. STRAVITZ

It is certified that error appears in the above-identified patent and that said Letters Patent is hereby corrected as shown below:

COLUMN 4, lines 63-64 (claim 1), change "shells, the support levels" to --shells, in each shell member the support levels--;

COLUMN 4, lines 66-67 (claim 1), change "members" to --member--.

Signed and Sealed this

Fifth Day of April 1983

[SEAL]

Attest:

GERALD J. MOSSINGHOFF

Attesting Officer    Commissioner of Patents and Trademarks